US008077059B2

(12) United States Patent
Davies et al.

(10) Patent No.: US 8,077,059 B2
(45) Date of Patent: Dec. 13, 2011

(54) DATABASE ADAPTER FOR RELATIONAL DATASETS

(76) Inventors: Eric John Davies, Victoria (CA); Michael Stuart Dunham-Wilkie, Victoria (CA)

( * ) Notice: Subject to any disclaimer, the term of this patent is extended or adjusted under 35 U.S.C. 154(b) by 1181 days.

(21) Appl. No.: 11/779,791

(22) Filed: Jul. 18, 2007

(65) Prior Publication Data

US 2008/0021914 A1    Jan. 24, 2008

Related U.S. Application Data

(60) Provisional application No. 60/832,365, filed on Jul. 21, 2006.

(51) Int. Cl.
*H03M 7/00* (2006.01)
(52) U.S. Cl. ............................................. 341/50; 341/51
(58) Field of Classification Search ............... 341/50, 341/51, 67
See application file for complete search history.

(56) References Cited

U.S. PATENT DOCUMENTS

| | | | |
|---|---|---|---|
| 5,276,868 A * | 1/1994 | Poole ........................... 707/693 |
| 5,467,087 A | 11/1995 | Chu | |
| 5,678,043 A | 10/1997 | Ng et al. | |
| 5,717,919 A | 2/1998 | Kodavalla | |
| 5,794,228 A * | 8/1998 | French et al. ................... 341/50 |
| 5,918,225 A | 6/1999 | White | |
| 6,006,232 A | 12/1999 | Lyons | |
| 6,112,207 A | 8/2000 | Nori et al. | |
| 6,169,990 B1 | 1/2001 | McGregor | |
| 6,272,501 B1 | 8/2001 | Baumann | |
| 6,430,565 B1 | 8/2002 | Berger | |
| 6,493,728 B1 | 12/2002 | Berger | |
| 6,691,132 B2 | 2/2004 | Walker | |
| 6,772,164 B2 | 8/2004 | Reinhardt | |
| 6,868,421 B1 | 3/2005 | Lin | |
| 7,103,608 B1 * | 9/2006 | Ozbutun et al. ............... 707/604 |
| 7,143,046 B2 | 11/2006 | Babu | |
| 7,251,370 B2 * | 7/2007 | Labelle ........................ 382/239 |
| 2004/0148301 A1 | 7/2004 | McKay | |
| 2005/0015374 A1 | 1/2005 | Reinauer | |
| 2006/0020603 A1 | 1/2006 | Lo Turco | |
| 2006/0123035 A1 | 6/2006 | Ivie | |

FOREIGN PATENT DOCUMENTS

CA        2485423        11/2003
WO    WO-2004/104774 A2    5/2004

OTHER PUBLICATIONS

Ray, Haritsa & Seshadri, "Database Compression: A Performance Enhancement Tool", Intl. Conf. on Management of Data, 1995, pp. 5-7, Computer Society of India, Pune, India.

(Continued)

*Primary Examiner* — Khai M Nguyen
(74) *Attorney, Agent, or Firm* — Gordon Thomson

(57) ABSTRACT

The invention is a database adapter providing improved methods for storing and retrieving relational data. Suitable source data is structured as a table with a fixed number of columns of predetermined types and a variable number of rows. The invention reduces the space and time used to store data and the time taken to retrieve stored data. The invention is best implemented inside Object Relational Database Systems, but can also be implemented in any database that can execute routines written in programming languages such as C#, C or Java. Functionally, the invention combines the concept of nested tables with fast compression techniques so that nested tables are practical for solving a wide class of problems.

6 Claims, 8 Drawing Sheets

OTHER PUBLICATIONS

Graefe & Shapiro, "Data Compression and Database Performance", Proc. ACM/IEEE-CS Symp. on Applied Computing,1991, pp. 2-5, ACM, New York, NY, USA.

Ahuja, "Introducing DB2 9, Part 1: Data compression in DB2 9", http://www.ibm.com/developerworks/db2/library/techarticle/dm-0605ahuja/, May 2006, pp. 1-2, IBM, USA.

Cockshott, McGregor, Kotsis, & Wilson, "Data Compression in Database Systems", Proc. 9th Intl. Workshop on Database and Expert Systems Application, 1998, pp. 3-7, IEEE Computer Society, Washington DC, USA.

Raman & Swart, "How to Wring a Table Dry: Entropy Compression of Relations and Querying of Compressed Relations", Proc. 32nd Intl. Conf. on Very Large Data Bases (VLDB), 2006, pp. 858-860, VLDB Endowment, Seoul, Korea.

Holloway, Raman, Swart & Dewitt, "How to Barter Bits for Chronons: Compression and Bandwidth Trade Offs for Database Scans", Proc. 2007 ACM SIGMOD, pp. 389-400, 2007, ACM, New York, NY, USA.

Abadi, Madden & Ferreira, "Integrating Compression and Execution in Column-Oriented Database Systems", Proc. 2006 ACM SIGMOD, 2006, pp. 3-5, ACM, New York, NY, USA.

Goldstein et al., "Compressing Relations and Indexes", Proceedings of the 14th International Conference on Data Engineering, ICDE 1998, Feb. 23-27, 1998, pp. 370-379.

* cited by examiner

DATABASE ADAPTER FOR RELATIONAL DATASETS

CROSS-REFERENCES TO OTHER APPLICATIONS

This application claims the benefit of U.S. provisional application 60/832,365 filed Jul. 21, 2006, the disclosure of which is incorporated herein by reference.

FIELD OF THE INVENTION

The invention relates generally to the storage and retrieval of data in a database management system ("DBMS"). More particularly, the invention relates to methods for efficiently storing and retrieving blocks of tuples comprising parts of a relational table. The data is stored in a compressed form (a "chip") which may be lossy according to a tolerance parameter specified for each individual column.

BACKGROUND TO THE INVENTION

Although relational databases provide an easily understood model of data and the relationships inherent therein, not all data fits compactly into the model. Data that does fit well typically has no implicit relationships between items (tuples) of data. For example, a relation describing employees might have a single key, the employee number, together with several hundred or even thousand characters of information describing the employee (for example, home address, phone number, email address). In this case there is little or no relation between the tuple of data items of one employee and those of another. Tuples of this sort frequently have a high information content in relation to the size of the identifying keys and their associated indexes. Conversely, data that does not fit well has regular, strong relationships between tuples. For example, data representing a log of atmospheric temperature in three dimensions might be recorded as tuples having one field for time, three fields for the spatial coordinates and one for the temperature; or video data might be stored with fields {frame number, row, column, pixel value}. In these examples, there are strong relations between the coordinates and, frequently, strong correlations between the measured values themselves. Using a relational database to store such data requires a large amount of identifying information (for example, spatial or raster coordinates) to be stored explicitly, thereby increasing the storage required.

EXAMPLES

Some examples of data that is difficult to deal with in a relational DBMS are briefly described below.

(1) Image Data

Two dimensional images might use the following schema to store the values of image pixels:

```
CREATE TABLE  images(
              image_id integer,
              pixel_row integer,
              pixel_column integer,
              red_band integer,
              green_band integer,
              blue_band integer
              );
```

It is important to observe that:
(a) Each pixel in the image requires a tuple in the table.
(b) In order to extract a portion of a single image, indexes are required for the image_id, pixel_row and pixel_column fields.
(c) This data is not well-organized for the extraction of the pixel values in scan line order.
(d) The scheme for the storage of this data misses the opportunity to exploit the strong correlations between adjacent pixel values, in which case most pixels contribute very little additional information.

With this representation, a single 640×480 pixel image requires 7200 KB (640 columns×480 rows×24 bytes per pixel). Additionally, indexes for the three key fields require a further 3,600 KB, for a total of approximately 10 MB per image. By comparison, a standard compressed version of this image as a JPEG file typically requires between 30 KB and 100 KB. The considerable difference in size is a reflection of the wasteful nature of a relational representation of this sort of data.

(2) Graphical Information System ("GIS") Data

Similarly, data relating to geometry shape points (such as polygons with holes) relevant to GIS applications might use a schema such as:

```
CREATE TABLE  geometry(
              geometry_id integer,
              piece_number integer,
              point_number integer,
              x double precision,
              y double precision,
              z double precision,
              measure double precision
              );
```

Again, a relatively large number of key values are required to identify a single datum.

(3) Time Series

A time series is a sequence of data points that are typically measured at successive times and at uniform time intervals. Time series arise in many applications and can consist of very large volumes of data sampled at high rates (many thousands of samples per second). One example is the output of an array of 3-component geophones, where each measurement would have one time coordinate, three spatial coordinates, and three measured values. Storing this output using the conventional relational model would require a separate row corresponding to each time point, and as the number of samples increases, would result in an unwieldy table. In addition, any attempt to index the data in these tables would yield indexes even larger than the original data and hence be unmanageable. Without indexes, searching the data for events would then require a linear scan of the table, which would be extremely time-consuming. Overall, relational databases are unable to take advantage of time series characteristics that could provide excellent opportunities for compression. These characteristics include regular sampling in time and space, and strong correlations between successive and adjacent samples.

(4) Satellite Imagery

Satellite imagery is recorded in swaths defined by the complex mechanics of a satellite's orbit around the Earth, and the image data collected can be projected onto a map. The image data typically contains multiple bands, one for each region of wavelengths the satellite sensor collects. If these images were stored in a database using a relational model, the resulting tables would be very large and too bulky to index, so that queries such as:

How much infrared energy was given off in areas where the cloud fraction was between 0.4 and 0.8?

What are the latitudes, longitudes and times for which the reflected light intensity was greater than 0.9?

What radiation was emitted in a particular area in a particular time window?

could not be handled efficiently.

As a result, raster images, geographic data, sound, and even time series data have historically been difficult to store as tuples in a relational database. Instead, the data has often been stored as binary large objects ("BLOBs") or in external files. In the case of object relational databases, this requires the use of different libraries to access different types of data. When a new type of data emerges, new software must be written.

SUMMARY OF THE PROBLEM

Relational databases model data as a rectangular table—a set of tuples, each tuple having a set of values, one per field. The simplest and most cpu-efficient strategy to store tuple data is simply to append each tuple to an existing region of storage. Unfortunately, although this may simplify updates and insertions, it produces a database ill-suited for retrievals. To remedy this problem, indexes, while adding to the overhead of storing data, do provide the means to find data more efficiently.

However, for some types of data, the relational model is awkward. The data does not fit well. The relational model, by design, must either discard valuable information available about the structure of the data and the relationships between the data items, or store that information explicitly in the database at considerable cost. Thus, the relational model focuses on simplicity of expression at the expense of efficiency of delivery. The result is a model of data which is simple to understand but which may produce a database which is bloated and slow.

It is not difficult to identify the problematic situations. Most usually occur where the data requires a large number of attribute fields (keys) to uniquely identify a datum. As most keys are usually indexed, there is an additional overhead in both storage and cpu for each of these key fields. In some of these cases, that is simply the nature of the data and no amount of science will eliminate the problem. However, in a good number of situations, the problem can be dramatically improved by making use of other information about the data. Much of the data that is inefficient to store in a relational DBMS commonly has one or both of the following characteristics:

(1) Surplus Precision

The values occurring in a field are known to have a limited precision that is less than the precision of the field in which they are stored. In short, each field can be stored in less space. (In some situations, the users of the data may simply be content to work with values of lesser precision.)

(2) Low Information Content

The values occurring in a column are sufficiently predictable that the entire set of values can be represented in much less space. A naive representation of a column does not take advantage of repeated stretches of values or recognizable patterns in the values.

As technology advances, the scale of the problem grows. The number and size of databases are both steadily increasing and the demands for fast response continue. In the context of relational databases, an ever increasing number of applications call for databases able to record data of the problematic types described above.

In summary, a solution to the problem should compress data by column so as to take advantage of relationships between adjacent (or nearby) data items and be able to rapidly store, search for and retrieve data.

In order to make the invention as widely applicable as possible:

(1) The solution needs to be implemented so that it can be supplied as a plug-in for existing DBMS products.

There are already many DBMSs in use. For most applications, these products perform adequately. What is required is the means to extend the use of these DBMSs to the sorts of problem data described above—not to replace existing DBMSs. Offloading existing databases and rebuilding them with a new DBMS is a very expensive and risky step, not to be undertaken lightly.

(2) The solution should provide suitable values for index building using standard DBMS tools.

(3) The compression algorithm needs to operate with minimal guidance from the designer of the database. The algorithm needs to be able to decide how the compression should be done based, as far as possible, on the data values themselves.

PRIOR ART

In U.S. Pat. No. 5,918,225 ("SQL based database system with improved indexing methodology", White et al., 1999) White addresses the problem of achieving higher read performance and more compact storage in databases designed for decision support systems ("DSS"). White sets out some of the specific design problems encountered (slow query response, slow index construction, large index size and slow record insertion) and, quite correctly, points out that storage of data by column offers good opportunities for compression. However, this patent does little to take advantage of the opportunity identified. White opines that the "vast majority of information in real-world DSS applications is low cardinality data; for example, a state field has only 50 unique values" and then suggests that this data can be compressed by replacing each two character state by a small integer, serving as a key into a look-up table of unique state values. Clearly, in order for this scheme to work, the small integer must take up less space than the original 16 bits. So, all is well as long as the small integer can be kept to one byte (representing 0-255). Regrettably, White does not disclose what happens if the field in question has initially 250 unique values, a one byte integer is used as the look-up pointer and, subsequently, 10 new values appear for this field in the data. Does the entire database have to be rebuilt? Are all inserts on hold until this is complete?

White discloses a two stage compression scheme. First a "natural data reduction" is applied to remove unnecessary high order bits, followed by a general purpose compression scheme such as LZW or run-length encoding. Although these schemes are quite rapid, they generally do not work well when applied to large volumes of numeric data, where successive values do not match the simple patterns for which the schemes were designed.

Further, White discloses that the compression is performed at the Cache or Buffer manager level. Presumably, this allows the compression scheme to be applied to many types of data. That appears useful—unless the expensive compression step is being applied to internal DBMS components that are already tuned for optimal performance. In that case, the compression scheme could have serious, deleterious consequences.

Stonebraker et al. in a paper describing their research on C-Store (Stonebraker et al., "C-Store: A Column-Oriented DBMS", Proceedings of the 31st VLDB Conference, Trondheim, Norway, 2005) outline the benefits of storing relational data by column. They suggest that there are two ways a column store can use CPU cycles to save disk bandwidth. Firstly, data elements can be coded into a more compact form. Secondly, values can be densepacked in storage.

In order to be able to provide multiple overlapping projections (with coverage of all the fields and some redundancy), C-Store needs to minimize its use of storage. Stonebraker et al. describe 3 situations where compression strategies may be useful. In every situation, compression relies on the ordering of the data. For Type 1, runs of values are stored as {value, repetition count, index of first occurrence}; for Type 2, each value is paired with a bitmap indicating where the value occurs in the column; for Type 3, values are stored as a first value and successive differences.

In order to be able to produce compact indexes, Stonebraker et al. describe a special-purpose indexing scheme which acts on the compressed representation of the data. However, this assumes that such a special-purpose indexing scheme will be provided as part of a new DBMS. Stonebraker et al. do not disclose any means of providing such indexing as a plug-in or retro-fit to existing DBMSs.

Lossy algorithms are commonly used for image and audio compression as they permit greater compression at the cost of some data degradation. For example, JPEG (Gregory K. Wallace, "The JPEG still picture compression standard", Communications of the ACM, Volume 34, Issue 4 (April 1991), pp: 30-44) is commonly used for images and MP3 (Richard Ehmer, "Masking by Tones vs. Noise Bands", JASA, Volume 3, Number 9, (September 1959), pp 1253-1256) for audio. However such lossy techniques do not work well with numerical data: they are unable to guarantee that the decompressed values will be within an appropriate tolerance of the original data.

SUMMARY OF THE INVENTION

The core invention described herein is a database adapter which can be installed in a wide variety of existing DBMSs. It can be accessed by individual client programs or through a general purpose DBMS. The adapter employs a set of methods to compress data expressed as tuples in relational tables. This results in compact and efficient storage of the data as well as the fast retrieval of tuples from such databases. The adapter is able to achieve very high compression ratios by:

- taking advantage of reduced precision ("tolerance") either where this occurs naturally in the data or where it is recognized as being acceptable by the database designer;
- by taking advantage of the natural ordering of the data; and
- by taking advantage of relationships between values in a field to replace data by a formula capable of generating the original data.

The invention operates on data presented as a two-dimensional table having rows (tuples) and columns (fields). Data is processed in chunks which are stored in discrete objects called chips. Each chip holds data for all the fields of a selected number of tuples. In the context of this invention, a chip is defined as a representation of a contiguous block of tuples in a relational table: it contains a serialized and compressed version of the tuples together with a schema for the block and a value for the tolerance for each column.

The invention does not require the designer to declare in advance how data compression is to be performed. The invention uses the value for the column tolerance, if specified, and the data values themselves to choose a compression scheme best-suited to each field of the data in the chip.

The compression is extremely compact because each column of data in the tuple is independently compressed using a variety of simple techniques. Columns that are constant or have a recognizable pattern can usually be reduced to a small number of bytes.

The database adapter employs a compression scheme which performs a set of successive tests. As soon as the data meets the requirements of a test, it is compressed using that algorithm. In some cases, data that has been compressed with one algorithm is compressed again, possibly recursively, until no further worthwhile compression can be achieved. If the data does not meet any of the tests, it is left unchanged.

The compression scheme employed by the adapter uses a carefully selected set of algorithms, chosen for their ability to produce high compression with low cpu usage. The selection of algorithms is slightly different for integer ("Int") and for floating point ("FP") data. The compression scheme selects between the following algorithms to encode:

(a) the values as an arithmetic sequence (Int and FP);
(b) the values as an arithmetic cycle (Int and FP);
(c) the values as a run length encoding (Int and FP);
(d) the values as a repeated sequence (Int and FP);
(e) the differences between successive values as a repeated sequence (Int and FP);
(f) the values as a fixed point encoding (Int and FP);
(g) the differences between successive values as a fixed point encoding (Int and FP);
(h) the values as 32-bit floating point values (FP only); or
(i) the values as 64-bit floating point values (FP only).

In a related aspect of the invention, a tolerance parameter may be specified for each column. This is used to control the tolerance employed when making FP comparisons, resulting in finding patterns much more frequently among FP values. This is used in algorithms (a), (b), (f) and (g) above.

In a further aspect of the invention, three of the algorithms employed are novel. These are (b), (d) and (e) above.

The result of the application of the invention is to produce chips. As each chip contains the data for many tuples, there are far fewer chips than tuples. In order to produce an index for a compressed column, the database adapter also constructs a derived field holding the smallest and largest values appearing in the column. The DBMS builds an index for this derived field in the usual way and, as there is only one entry in the index per chip, the size of the index is considerably reduced. The method employed is a further aspect of the invention.

Use of the invention produces a number of advantages:
- the total file space required is reduced;
- the amount of data that must be transferred between a client and the server is smaller;
- the amount of disk I/O needed to extract the original data is smaller;
- The sizes of associated database indexes are reduced since the indexes hold references to chips rather than to table rows, and there are far fewer chips than table rows (typically by a factor of 500).
- As the indexes are smaller, index creation is much faster and new data can be inserted faster into an already indexed table.

The reduced size of indexes means that it is more practical to support more indexes.

The amount of database logging required for transactions is far less because fewer rows are referenced.

Each chip has its own internal schema. The schema defines the names, types, and the tolerance of each column in the chip. This means that two chips in the same table can have different schemas.

Chips can be assembled and disassembled either inside or outside a DBMS.

Clients with a lesser functionality ("thin clients") can rely on the database adapter to prepare compressed chips. Alternatively, clients can take on the task of preparing chips ("fat clients") thus reducing the work to be done by a central, shared server.

The basic search and extraction functions apply to all chips, regardless of their schema or the type of data they hold.

Additional application domains can be handled by adding a relatively small set of special purpose functions because these applications are able to take advantage of the base capabilities (storage, transmission, indexing) provided by the invention.

Custom compression techniques can be implemented by users on the client side, and custom decompression techniques can be added to the server side (by the user), allowing domain-specific compression schemes.

DETAILED DESCRIPTION

Figure 1:
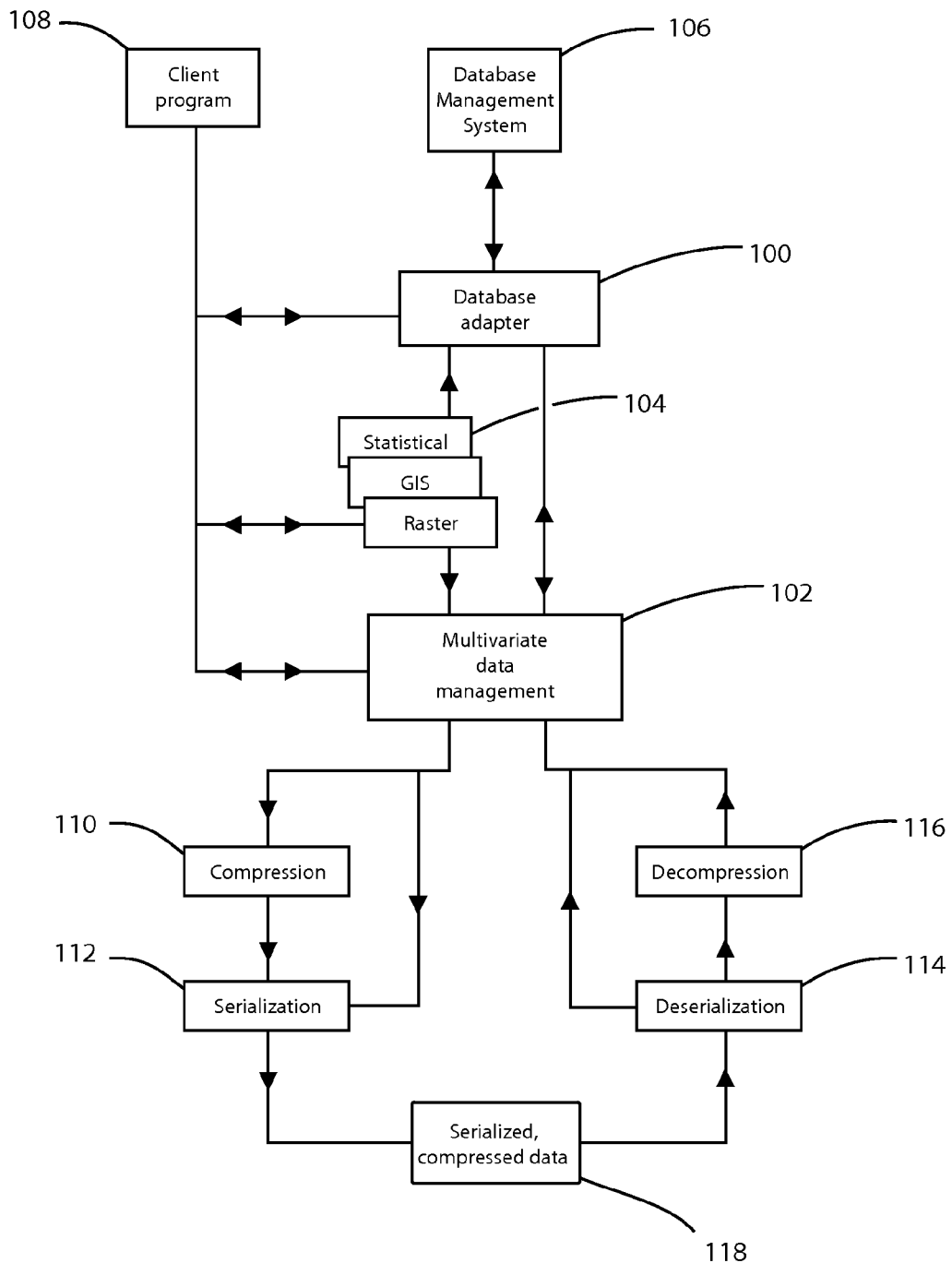
FIG. 1 shows a block diagram of the general structure of the invention together with its interfaces to the external environment.

FIG. 1 shows the preferred embodiment of the invention. The database adapter 100 is a general interface to the functionality provided by the multivariate data management module 102. The database adapter 100 is customized to be portable to a variety of different DBMSs running on a variety of different hardware platforms. The multivariate data management module 102 works in conjunction with a compression module 110 and a serialization module 112 to store serialized, compressed data 118 in a database. Retrieval of data from the database uses a deserialization module 114 and a decompression module 116 to convert stored data 118 to the data's original type.

The multivariate data management module 102 also provides the following functionality:

Creation of a new, empty multivariate dataset.
Addition of a column to a multivariate dataset.
Setting the numeric precision of a column.
Specification of a preferred compression scheme for a column.

By default, the multivariate data management module 102 selects a compression scheme for a particular column of data based on the characteristics of the data. However, in order to optimize loading data, client applications may bypass the selection by specifying a compression scheme explicitly.

Addition of a row to a multivariate dataset.
Setting the value of a particular element in a multivariate dataset.
Getting the number of columns in a multivariated at a set.
Getting the name of a column in a multivariate dataset.
Getting the type of a column in a multivariate dataset.
Getting the numeric precision of a column in a multivariate dataset.
Getting the value of a particular element in a multivariate dataset.
Getting the extents of a named set of columns in the multivariate dataset for use as a multi-dimensional key.
Discarding all columns in a multivariate dataset except a named set (classical projection).
Discarding all rows in a multivariate dataset except those whose values fall in particular ranges (classical selection).
Conversion of a multivariate dataset to a compact byte stream.
Building a multivariate dataset from a compact byte stream.
Generation of a multi-dimensional index key representing the ranges of values in one or more columns of a chip.
Selection of particular rows of a chip based on range criteria.
Selection of particular columns of a chip based on a list of column names.
Retrieval of rows of a chip as a row type (in databases that support returning row types).
Insertion of the contents of a chip into a table.
Conversion of groups of rows of a table or view into chips.

The database adapter 100 provides a general interface to the multivariate data management module 102. However, in appropriate situations it is helpful to provide specialized modules customized for particular types of data. FIG. 1 shows three examples of such modules 104:

(1) The statistical module provides the ability to perform statistical computations on multivariate data.

(2) The GIS module provides the ability to manipulate points, lines, polygons, and coverages that have been represented as multivariate data. It includes functions for spatial predicates and operations.

(3) The Raster module provides operations on raster images that have been stored as multivariate data.

Typically, the database adapter 100 is preferably used by either a general purpose DBMS 106 or by a client program 108. FIG. 1 shows a general purpose DBMS 106 making calls directly to the multivariate data management module 102 through the database adapter 100. Alternatively, a client program 108 can use the invention by making calls to the database adapter 100, to specialized data modules 104 or directly to the multivariate data management module 102.

The Compression and Serialization Modules

Data is compressed by the compression module 110. This module compresses each column within a chip individually, very often resulting in the use of different algorithms for different columns. After compression, the data is serialized by the serialization module 112 to produce a compact byte stream. The compact byte stream represents compressed data by means of descriptive tags and associated sequences of bytes. The compact byte stream is in a machine-independent format.

The compression module 110 uses one set of routines to compress floating point values and a parallel set of routines to compress integer values.

Floating Point Values

Where the data are provided as floating point numbers, many schemes have difficulty producing any useful compression, due principally to the difficulty in accurately doing arithmetic and making comparisons between floating point values.

Where floating point values are used, a test is made to assess whether it is worthwhile to attempt compression. This test is true when:
 (1) the tolerance has been set to a positive value indicating that approximate values may be used; or
 (2) the floating point values can be represented as the product of a set of integers with a single floating point value.

For floating point values, the compression schemes can be lossy. Only enough information is saved to be able to reconstruct floating point values to a specified level of precision (tolerance). The tolerance is specified as a parameter of each column and is an absolute value. For example, if temperatures stored as floating point values are only needed to be used with an accuracy of 2 decimal digits, the tolerance parameter would be specified as 0.01. A zero value specified for the tolerance is taken to mean that the choice of compression schemes is limited to those that exactly preserve the original values.

Figure 2:
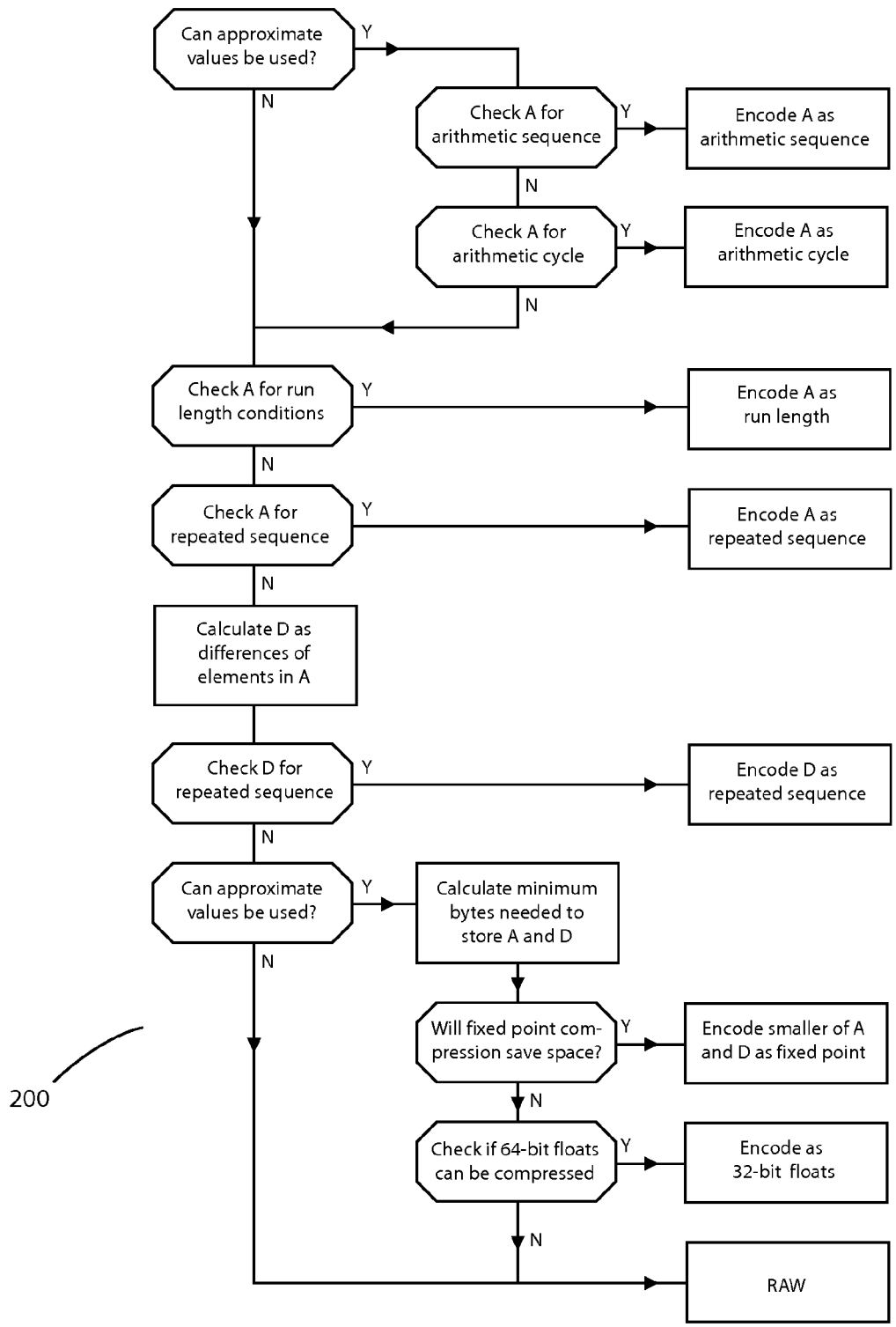
FIG. 2 shows a flowchart of the operation of the compression module on floating point data.
Figure 4:
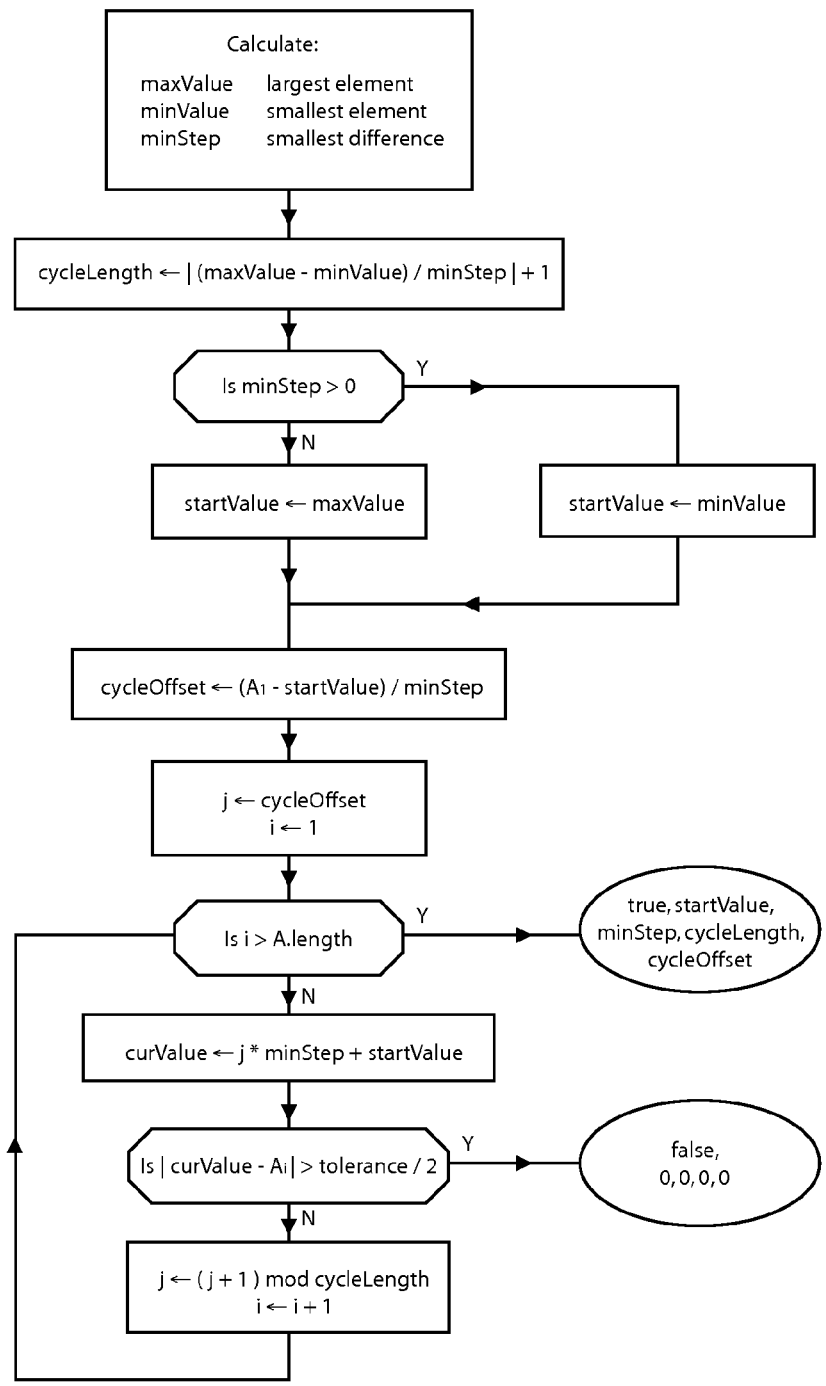
FIG. 4 shows a flowchart of the encoding of values as an arithmetic cycle.
Figure 5:
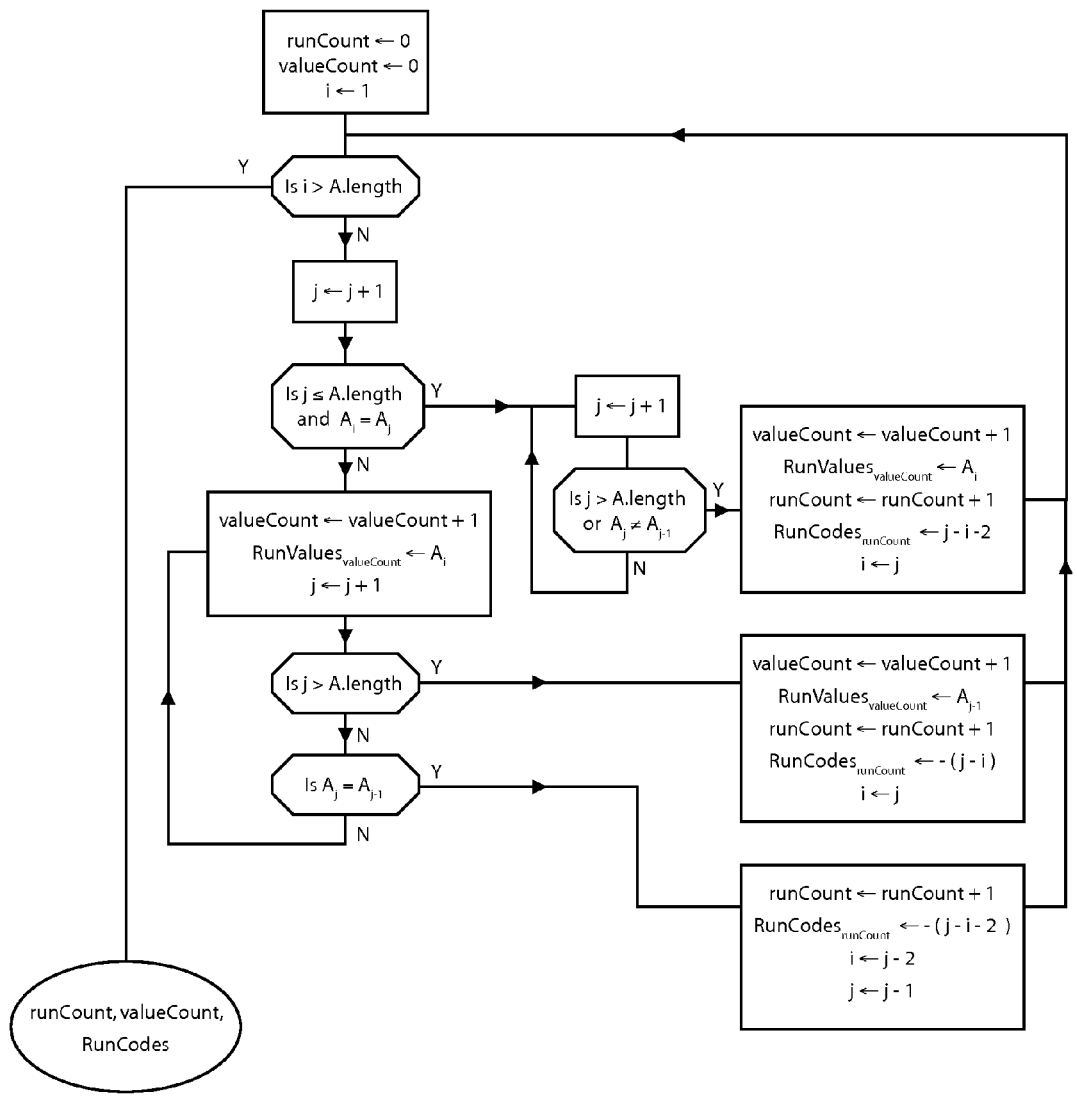
FIG. 5 shows a flowchart of the encoding of values with run length encoding.
Figure 6:
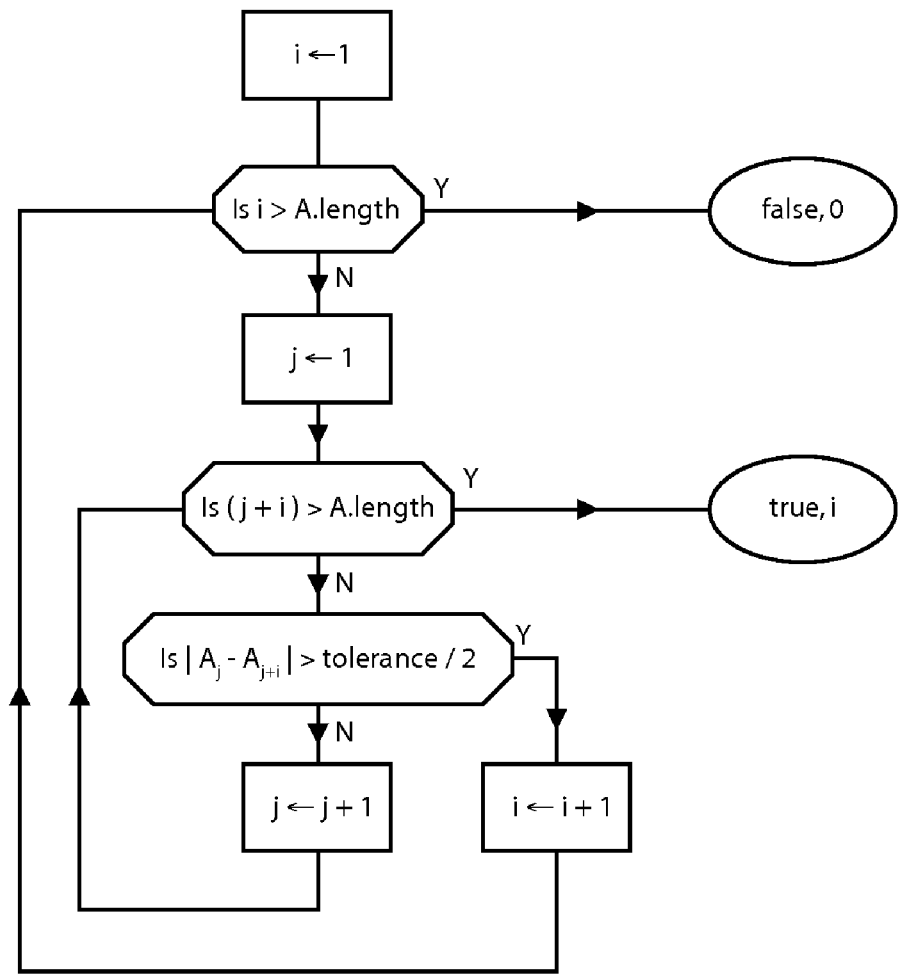
FIG. 6 shows a flowchart of the check made for the encoding of values as a repeated sequence.
Figure 7:
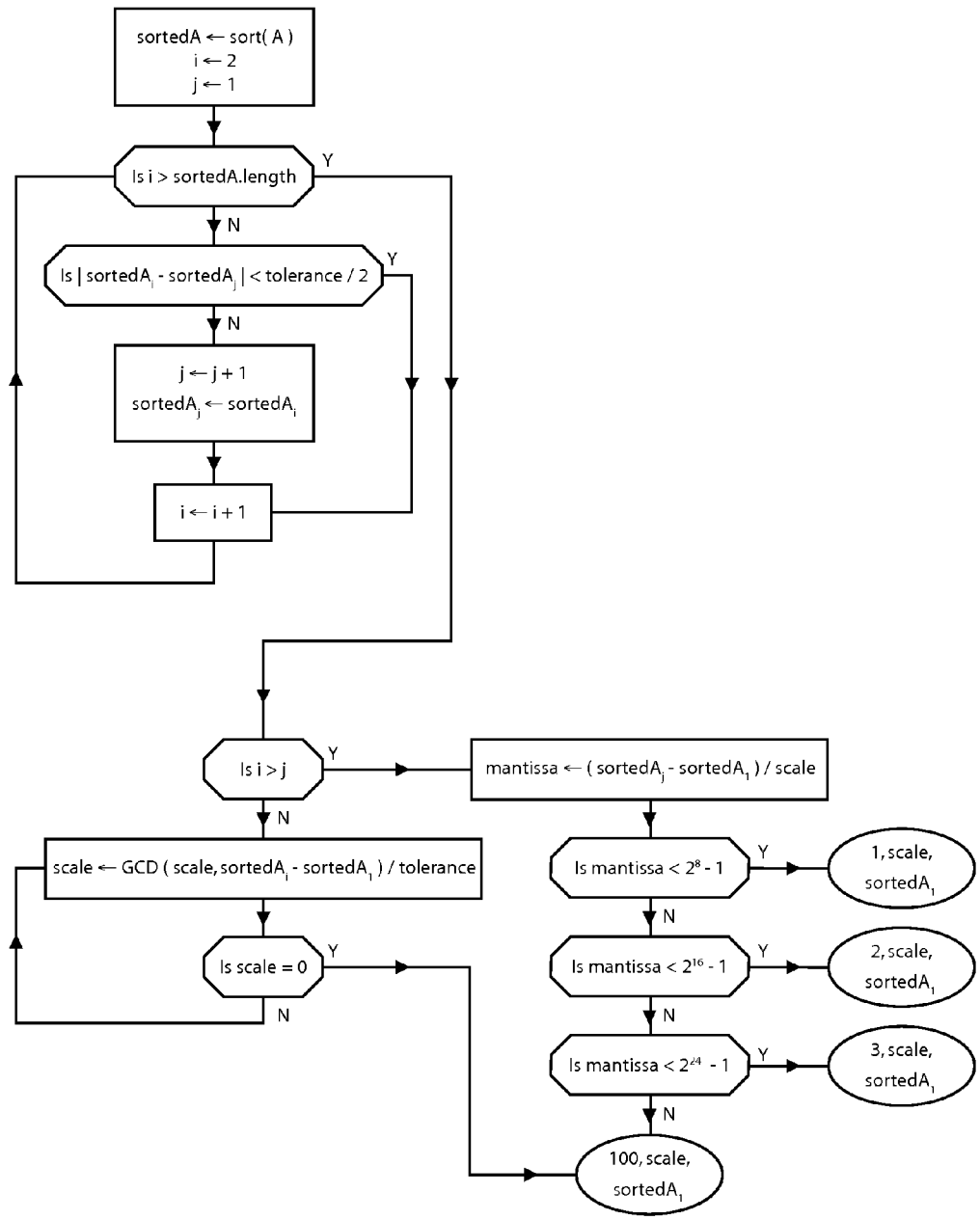
FIG. 7 shows a flowchart of the calculation of the size of the mantissa for a fixed point encoding.
Figure 8:
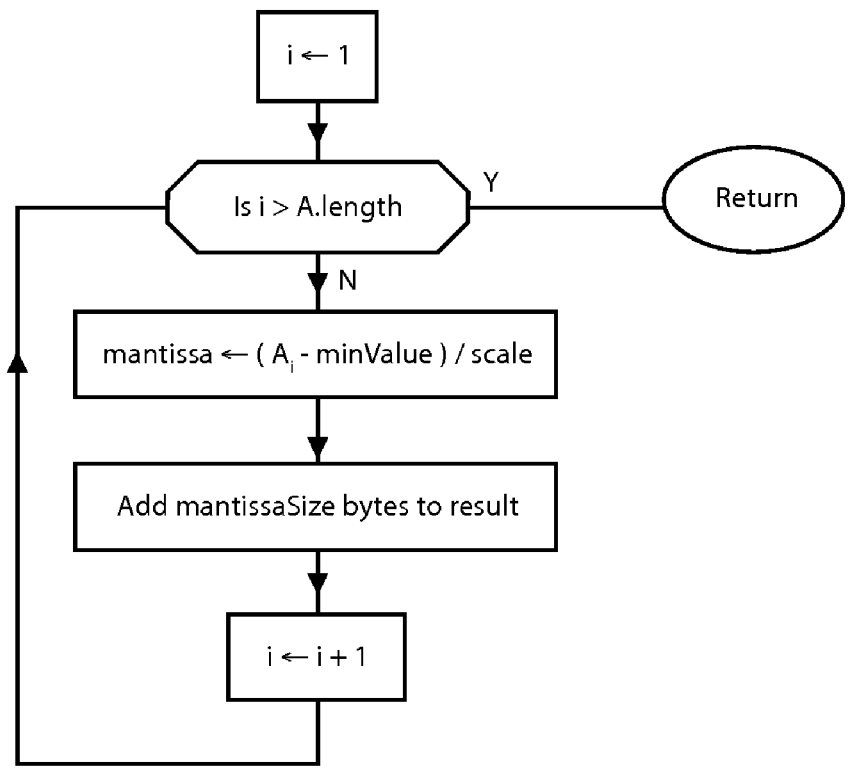
FIG. 8 shows a flowchart of the encoding of values with a fixed point encoding.

The compression module 110 has a suite of compression schemes and applies the one that results in the greatest space savings. In some cases, the output of one compression scheme results in a reduced set of values that can be compressed further with a subsequent scheme. The type of the compression chosen is expressed in the first four bytes of the compressed output so that the decompression module 116 knows which complementary methods to use for decompression. The logic of the compression of floating point values is shown generally as 200 in FIG. 2. The compression schemes employed are:
 (1) Arithmetic Sequence
 A list of values is treated as an arithmetic sequence if it can be expressed in the form:

$$a_i = r + (i-1)*d$$

where r is the first value, i is an index running from 1 to the number of values in the list and d is the difference.
 The check for whether the input array can be sufficiently accurately represented as an arithmetic sequence:
  (a) calculates the differences between successive pairs of values in the array; and
  (b) performs a tolerant comparison (equal to within half of the specified tolerance value) of each calculated difference with the first of the differences so calculated.
 If the test is successful, the result is a descriptive tag and the values for r and d.
 (2) Arithmetic Cycle
 A list of values is treated as an arithmetic cycle if it can be expressed as a repeating arithmetic sequence of the form:

$$a_i = r + ((i+p) \bmod q)*d$$

where r is the first value, i is an index running from 1 to the number of values in the list, p is an offset, q is the length of the cycle and d is the difference.
 The algorithm to determine if an arithmetic cycle is present is shown in FIG. 4. This first finds the minimum and maximum values in the input values, A, as well as the minimum distance between two consecutive values. From this, it infers the length of a repeating arithmetic sequence.
 An arithmetic cycle is stored with a descriptive tag and the values for p, q, r and d.
 (3) Run-Length
 If there is sufficient duplication in the list of values (typically, if more than 50% of the values in a list are duplicates of an adjacent value), then a run-length encoding is used. The algorithm for run-length encoding is shown in FIG. 5.
 The result of the encoding is a descriptive tag and signed one byte integer counts followed by values. A byte count in the range −128 to −1 represents a run of unrepeated values of length 128 to 1 respectively. A byte count in the range 0 to 127 represents a run of repeated values of length 2 to 129 respectively. The run counts are stored separately from the run values so that the run values can be further compressed by another compression scheme.
 (4) Values as a Repeated Sequence
 A list of values is treated as a repeating sequence if it can be expressed in the form:

$$a_i = s_i \bmod q$$

where s is a smaller set of values which repeat, q is the cycle length and i is an index running from 1 to the number of values in the list. The algorithm for values to be encoded as a repeated sequence is shown in FIG. 6.
 A repeating sequence is represented by a descriptive tag, the value for q and a smaller set of values s (that may be further compressed). For example, the list 9, 6, 4, 9, 6, 4, 9, 6, 4, 9 can be reduced to a cycle length of 3 and values 9, 6, 4.
 (5) Differences as a Repeated Sequence
 Just as the elements of a list may be represented as a repeated sequence, so may the differences between successive elements. If the differences satisfy the requirements for a repeated sequence, then the list of values can be reduced to a descriptive tag, the value for the cycle length q and the smaller list of values s, which may be subject to another compression pass.
 This form of encoding is very useful for expressing timestamps (usually floating point values representing the number of seconds since Jan. 1, 1970, UTC) such as 4 pm every Tuesday and 6 pm every Thursday. For example, the list 7, 8, 11, 10, 11, 14, 13, 14, 17 can be reduced to 7 (the first element), 3 (the cycle length) and the smaller list 1, 3, −1.
 (6) Values as a Fixed Point Encoding
 If all the values in a list can be expressed in the form:

$$a_i = r + s_i*d$$

where the elements of s are integers all expressible either as one, two or three bytes, then the list is reduced to a descriptive tag, a value specifying how many bytes each element of s requires, the values for r and d and the list of values s.
 FIG. 7 shows the algorithm employed to calculate the smallest number of bytes required to store the values in the list. This value ("mantissaSize"), the scale employed and the initial value are used to encode the complete list of values in a fixed point encoding as is shown in FIG. 8.

(7) Differences as a Fixed Point Encoding

Just as a list of values may be encoded as fixed point so may the differences between successive elements. This is possible when the list of values can be expressed in the form:

$$a_i = a_{i-1} + s_i * d$$

where i is an index running from 2 to the number of values in the list and the elements of s are integers all expressible either as one, two or three bytes.

Encoding the differences as fixed point is very similar to encoding the original list of values. The result has a descriptive tag, a value specifying how many bytes each element of requires, the values for $a_1$ and d and the list of values s.

(8) Float Encoding

If a list of 64-bit floating point values can be expressed as 32-bit floating point values without violating the precision requirements, the list is reduced to 32-bit floats.

(9) Raw

The binary values in the list are left without compression.

Two-Dimensional Image Data

The preceding methods are only concerned with exploiting linear relationships. Image data typically has relationships extending in two dimensions, allowing greater compression options. The adapter also supports Portable Network Graphics ("PNG") and Joint Photographic Experts Group ("JPEG2000") formats in the client access API, but does not automatically select them. These methods must be specified by the database designer and are intended to be used, where appropriate, by image loading client programs.

Integer Values

Figure 3:
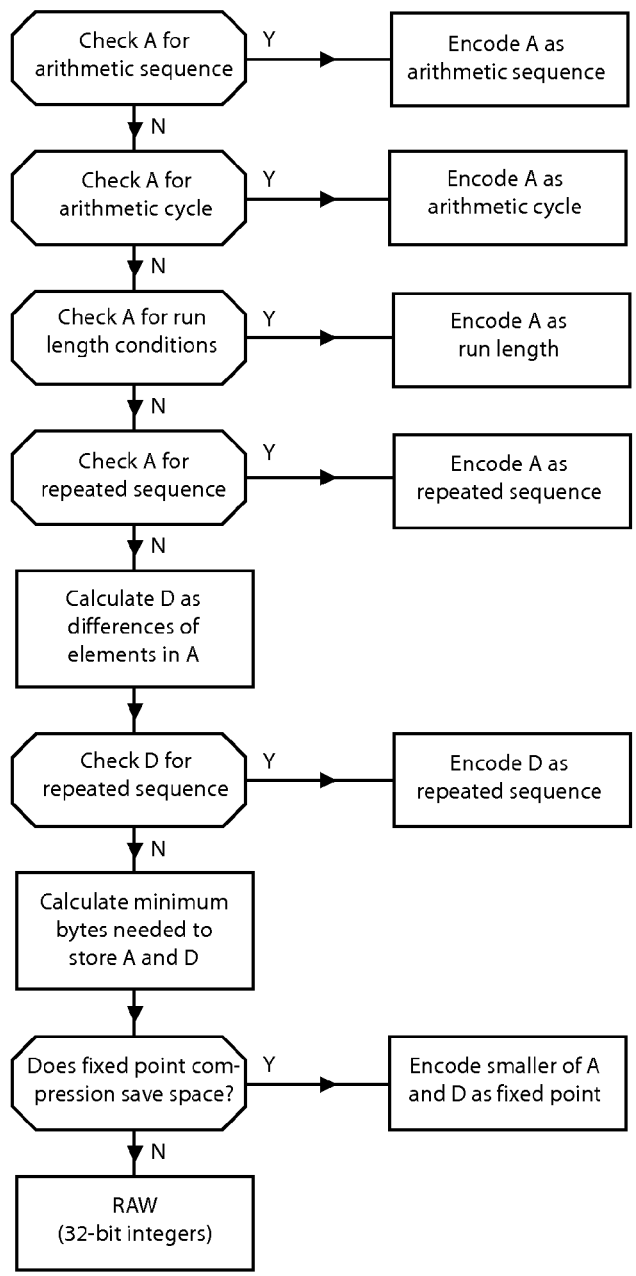
FIG. 3 shows a flowchart of the operation of the compression module on integer data.

Compression of integer data is shown in FIG. 3. The algorithm follows the pattern of that for floating point values but without use of the tolerance parameter. In effect the tolerance parameter is 1.

Decompression Module

The Decompression Module holds a suite of decompression routines complementary to the compression routines. The first 4 bytes in the serialized data to be decompressed identify the type of the decompression. For the codes matching the compression routines listed above, the Decompression Module simply calls the appropriate decompression library.

There is a special decompression code with a value of 1000. This decompression code is used to indicate that the decompression routine is actually present external to the invention itself. In this case, the textual name of the compression routine follows (as a null-terminated string, not exceeding 30 characters). This name is used as a key to look up the name of a decompression routine in a table with the following schema:

```
create table    DSChip_decompress(
                compress_type varchar(30),
                function_name varchar(256)
                );
```

The named decompression routine is accessed through the SQL interface and returns the decompressed data re-serialized in the raw form. This mechanism allows the invention to be extended by users to support additional decompression routines inside the server.

Serialization Module

The Serialization Module converts scalar values and character strings to a serialized form that is machine-independent. It does this by converting items larger than 8 bits to a little-endian format.

Deserialization Module

The Deserialization Module converts serialized data to the host machine's format. It does this by converting the data from little-endian format to the native endian format.

Indexing

The database adapter 100 provides for the construction of multiple indexes, each index using any selected subset of internal columns in the chips as a search key. The process of constructing an index is as follows:

An n-dimensional box column is added to the table containing the chips. Alternatively, the box column is defined when the table is first created.

A function supplied by the invention is used to populate the box column. This function takes a string specifying a subset of internal column names and a chip as an argument, and returns an n-dimensional box that represents the minimum and maximum values of the columns. The function can be called from database insert or update triggers, or it can be invoked explicitly by a client with an update statement.

An R-Tree or GiST Index (whichever is supported by the underlying DBMS) is created on the box column.

The following example illustrates the commands that could be used to create an index.

```
ALTER TABLE some_chips_table ADD COLUMN boxKeyColumn
NDBox;
UPDATE some_chips_table set boxKeyColumn =
DSChipToNDBox(DSChip_column, 'x,z');
CREATE INDEX boxIndex on some_chips_table using
gist(boxKeyColumn);
```

In essence, this chip indexing strategy provides the equivalent of multi-dimensional, multi-level aggregate indexes without needing elaborate client support.

On databases that support functional indexes, it is possible to create an index without adding or populating a box column.

An Example of Compressing a Dataset

Consider the following schema that could be used to store an image in a simple table structure.

```
create table    imageTable (
                image_id integer,
                pixel_row integer,
                pixel_column integer,
                red_band integer,
                green_band integer,
                blue_band integer
                );
```

The following table defines a 4×4 patch of pixels for a portion of an image (of a person's face) beginning at row 636 and column 421.

| image_id | pixel_row | pixel_column | red_band | green_band | blue_band |
|---|---|---|---|---|---|
| 1035 | 636 | 421 | 234 | 145 | 111 |
| 1035 | 636 | 422 | 250 | 167 | 133 |
| 1035 | 636 | 423 | 243 | 148 | 116 |
| 1035 | 636 | 424 | 247 | 183 | 155 |
| 1035 | 637 | 421 | 242 | 162 | 129 |
| 1035 | 637 | 422 | 250 | 167 | 133 |
| 1035 | 637 | 423 | 249 | 176 | 144 |
| 1035 | 637 | 424 | 247 | 183 | 155 |
| 1035 | 638 | 421 | 240 | 156 | 128 |
| 1035 | 638 | 422 | 255 | 180 | 154 |
| 1035 | 638 | 423 | 255 | 190 | 168 |
| 1035 | 638 | 424 | 235 | 172 | 157 |
| 1035 | 639 | 421 | 242 | 150 | 127 |
| 1035 | 639 | 422 | 242 | 169 | 152 |
| 1035 | 639 | 423 | 243 | 152 | 123 |
| 1035 | 639 | 424 | 235 | 172 | 157 |

Using the native table structure above, this image would require 6×16×4=384 bytes.

The same schema could be used to represent the data inside a chip. The choice of an image is simply to illustrate application of the compression schemes to data with differing internal structures. Normally, the length of each column would be much larger, and an image-specific compression scheme would be applied to the red_band, green_band, and blue_band columns. However, when the chip was serialized (for transport to a database or storage inside a BLOB), the columns would be individually compressed as follows:

(1) The Image_Id Column:
1035, 1035, 1035, 1035, 1035, 1035, 1035, 1035, 1035, 1035, 1035, 1035, 1035, 1035, 1035, 1035

The sequence is checked to see if it can be encoded as an arithmetic sequence. Since the entire column has the value 1035, the column can be serialized as the series with the parameters: start value=1035, r=0. The column is serialized as the (arithmetic Sequence TAG, 1035, 0), for a total length of 12 bytes.

(2) The Pixel_Row Column:
636, 636, 636, 636, 637, 637, 637, 637, 638, 638, 638, 638, 639, 639, 639, 639

The sequence is checked to see if it can be encoded as an arithmetic sequence. It can not since the difference between consecutive values is not constant.

The sequence is then checked to see if it can be encoded as an arithmetic cycle. That test also fails.

The sequence is then checked to see if it can be encoded using run-length encoding. There are 12 duplicated values, which is >=the series length 16/2. Therefore run-length encoding can be used. The run-length encoding produces the following set of run codes and run values:
run codes: 2, 2, 2, 2
run values: 636, 637, 638, 639

The run-length encoding procedure recursively invokes the compression code on the run values. The run values are in turn encoded as the arithmetic sequence (arithmeticSequenceTAG, 636, 1). The complete serialization column becomes (runlength TAG, 4, 4, 2, 2, 2, 2, arithmeticSequenceTAG, 636, 1). The "4, 4" in the serialization preceding denotes the number of run codes followed by the number of run values. Because the run codes are 1 byte quantities, the total size is 7×4=28 bytes.

(3) The Pixel_Column Column:
421, 422, 423, 424, 421, 422, 423, 424, 421, 422, 423, 424, 421, 422, 423, 424

The sequence is checked to see if it can be encoded as an arithmetic sequence. However, the differences between consecutive elements are not constant (they are either 1 or −3) and that check fails.

Next, the sequence is checked to see if it can be represented as an arithmetic cycle. The code determines that the minimum value is 421, the maximum value is 424, the minimum step is 1, and the apparent cycle length=(424-421+1)/1=4, and the cycle offset is 0. The code then verifies it can correctly reproduce the original sequence from these parameters. As a result the sequence is coded as the values (arithmeticCycleTAG, 421, 1, 4, 0). The total size is 5×4=20 bytes.

(4) The Red_Band Column:
234, 250, 243, 247, 242, 250, 249, 247, 240, 255, 255, 235, 242, 242, 243, 235

The sequence is checked to see if it can be coded as an arithmetic sequence. This check fails, as does the arithmetic cycle check, the run-length encoding check, and sequence check. The code next computes the differences between consecutive elements to produce the sequence D: 16, −7, 4, −5, 8, −1, −2, −7, 15, 0, −20, 7, 0, 1, −8. Next, it computes the parameters needed to represent each sequence in fixed point notation. Both the original sequence and the sequence D require one byte per element, so the original sequence is converted to fixed point notation by subtracting the minimum value (234), and dividing by the GCD (1), to produce values=0, 16, 9, 13, 8, 16, 15, 13, 6, 21, 21, 1, 8, 8, 9, 1. The entire serialization of the sequence has the form (fixedPointTAG, 1, 1, 234, 0, 16, 9, 13, 8, 16, 15, 13, 6, 21, 21, 1, 8, 8, 9, 1). The total size is 4×4+16=32 bytes.

(5) The Green_Band Column:
145, 167, 148, 183, 162, 167, 176, 183, 156, 180, 190, 172, 150, 169, 152, 172

The sequence is checked to see if it can be coded as an arithmetic sequence. This check fails, as does the arithmetic cycle check, the run-length encoding check, and sequence check. The code next computes the differences between consecutive elements to produce the sequence D: 22, −19, 35, −21, 5, 9, 7, −27, 24, 10, −18, −22, 19, −17, 20. Next, it computes the parameters needed to represent each sequence in fixed point notation. Both the original sequence and the sequence D require one byte per element, so the original sequence is converted to fixed point notation by subtracting the minimum value (145), and dividing by the GCD (1), to produce values=0, 22, 3, 38, 17, 22, 31, 38, 11, 35, 45, 27, 5, 24, 7, 27. The entire serialization of the sequence has the form (fixedPointTAG, 1, 1, 145, 0, 22, 3, 38, 17, 22, 31, 38, 11, 35, 45, 27, 5, 24, 7, 27). The total size is 4×4+16=32 bytes.

(6) The Blue_Band Column:
111, 133, 116, 155, 129, 133, 144, 155, 128, 154, 168, 157, 127, 152, 123, 157.

The sequence is checked to see if it can be coded as an arithmetic sequence. This check fails, as does the arithmetic cycle check, the run-length encoding check, and sequence check. The code next computes the differences between consecutive elements to produce the sequence D: 22, −17, 39, −26, 4, 11, 11, −27, 26, 14, −11, −30, 25, −29, 34. Next, it computes the parameters needed to represent each sequence in fixed point notation. Both the original sequence and the sequence D require one byte per element, so the original sequence is converted to fixed point notation by subtracting the minimum value (111), and dividing by the GCD (1), to produce values=0, 22, 5, 44, 18, 22, 33, 44, 17, 43, 57, 46, 16, 41, 12, 46. The entire serialization of the sequence has the form (fixedPointTAG, 1, 1, 111, 0, 22, 5, 44, 18, 22, 33, 44, 17, 43, 57, 46, 16, 41, 12, 46). The total size is 4×4+16=32 bytes.

A humanly-readable version of the final serialized representation of the chip would be:

(versionTAG, 1000, 16, 6, "image_id", int_TAG, 12, "pixel_row", int_TAG, 28, "pixel_column", int_TAG, 20, "red_band", int_TAG, 32, "green_band", int_TAG, 32, blue_band", int_TAG, 32, arithmeticSequenceTAG, 1035, 0, runlengthTAG, 4, 4, 2, 2, 2, 2, arithmeticSeriesTAG, 636, 1, arithmeticCycleTAG, 421, 1, 4, 0, fixedPointTAG, 1, 1, 234, 0, 16, 9, 13, 8, 16, 15, 13, 6, 21, 21, 1, 8, 8, 9, 1, fixedPointTAG, 1, 1, 145, 0, 22, 3, 38, 17, 22, 31, 38, 11, 35, 45, 27, 5, 24, 7, 27, fixedPointTAG, 1, 1, 111, 0, 22, 5, 44, 18, 22, 33, 44, 17, 43, 57, 46, 16, 41, 12, 46).

This is stored as a single cell in a single chip column in a single row of a table.

Loading Data into Tables from a Client

Consider the following dataset

| X (integer) | Y (double, tolerance = 0.1) | Z (double, tolerance = 0.001) |
|---|---|---|
| 10 | 1.0 | 3.2003 |
| 10 | 2.0 | 3.4002 |
| 20 | 3.0 | 3.599901 |
| 20 | 5.0 | 3.0 |
| 30 | 7.0 | 3.2 |
| 30 | 0.4 | 3.4 |
| 30 | 0.8 | 3.6 |
| 40 | 0.6 | 3.0 |
| 50 | 1.0 | 3.2 |
| 50 | 20.0 | 3.4 |

In order to load this data, a client program performs the following steps:
(1) A multivariate data object is created using the client libraries provided with the multivariate data management module 102.
(2) The desired columns are added to the data object and it is populated with data.
(3) The multivariate data object is compressed and serialized.
   (a) For each column in the multivariate data object, the compression module 112 is used to build a compressed, serialized form of the column.
      For the column named 'X', the run-length encoding routine converts the data to the run counts {0, 0, 1, −1, 0} and the run values {10, 20, 30, 40, 50}. The run values are then compressed as an arithmetic sequence with parameters r=10 and d=10.
      For the column named 'Y', the Fixed Point encoding routine recognizes that it can encode the run values as r=0.4, d=0.2, s=(3, 8, 13, 23, 33, 0, 2, 1, 3, 98), storing s as 1 byte values.
      For the column named 'Z', the Arithmetic Cycle encoding routine recognizes that it can encode the values with the parameters r=3.0, p=1, d=0.2, q=4.
   (b) The multivariate data management module 102 then serializes a version identifying tag, the number of rows for which space has been allocated in the multivariate data object, the actual number of rows which have data in them, the number of columns and, for each column, the column's name, the column's type, the column's tolerance, the length of the column's serialized form and the serialized form of each column's data.
   (c) The client then issues an SQL insert statement, passing in the serialized data, such as:

```
INSERT
INTO some_chips_table(DSChip_column)
VALUES( DSChipFromBytes( . . . ));
```

The DSChipFromBytes routine in the database adapter 100 is called with the serialized data. This routine copies the serialized data into an object or a BLOB. The server then stores the new object in the some_chips_table.

Providing Data to a Fat Client

The client program requests data with an SQL select statement, such as:

```
SELECT
DSChipExtract(DSChip_column, 'x y', 'x −0.4 0.8, z −10 20')
FROM some_chips_table
WHERE overlap( boxKeyColumn, CreateBoxKey('(−0.4,−10),(0.8,20)'));
```

The server invokes the DSChipExtract routine in the database adapter 100, passing it a reference to a chip and the two strings. The DSChipExtract routine converts the two strings to null terminated strings as used by C, and extracts the raw binary data in the chip as an array of bytes. The DSChipExtract routine then invokes the multivariate data management module 102 to construct a multivariate data object from the array of bytes.

The multivariate data management module 102 extracts the following data from the array of bytes.
(a) A version identifying tag.
(b) The maximum number of rows to allocate space for.
(c) The actual number of rows that have data in them.

(d) The number of columns.

(e) For each column, the column's name, type, tolerance and length.

(f) For each column, the serialized data for that column is decompressed using the deserialization module 114 and the decompression module 116.

The DSChipExtract routine then uses the multivariate data management module 102 to discard any rows containing data where x<−0.4 or x>0.8 or z<−10 or z>20 and to discard all columns except x and y.

The DSChipExtract routine then uses the multivariate data management module 102 to serialize the modified multivariate data object (this process is not broken down further since it has already been described) and stores the serialized data in an object.

The server passes the object to the client program.

The client program typically uses its own copy of the multivariate data management module to deserialize and otherwise access the data in the object.

ALTERNATIVE EMBODIMENTS

The foregoing is a description of the preferred embodiment of the invention. As is readily apparent to one skilled in the art, variations in the design that do not alter the scope of the invention are contemplated. For example:

While the preferred embodiment stores serialized chips as BLOBs, in some variations they can be stored as binary string types, or in files on a file system.

While text is not currently supported as a column type, in some variations it can be included—for example with Huffman or LZW compression.

While the compression scheme is selected on a per chip basis, in some variations a compression scheme could be selected on the basis of a single chip and used on a number of subsequent chips before another compression scheme is selected.

We claim:

1. A method for compressing a database of data arranged in rows and columns, said data being partitioned into one or more blocks, each block containing one or more contiguous rows, said method comprising a compression step and a serialization step wherein the compression step compresses data for a column within a block, col-data, to produce compressed data, said compressed data being subsequently serialized by the serialization step to produce a chip for storage in the database, said compression step being applied to each column of each block in the database, characterized in that the compression step:

(a) if said col-data can be represented as an arithmetic sequence, encodes said col-data as an arithmetic sequence;

(b) if said col-data can be represented as an arithmetic cycle, encodes said col-data as an arithmetic cycle;

(c) if said col-data can be represented as a run length encoding, encodes said col-data as a run length encoding;

(d) if said col-data can be represented as a repeated sequence, encodes said col-data as a repeated sequence;

(e) uses a differencing sub-step to select a first datum from col-data and to calculate difference-data as the difference between successive rows in col-data;

(f) if said difference-data can be represented as a repeated sequence, encodes said col-data as said first datum and a repeated sequence of said difference-data;

(g) uses a storage-calculation sub-step to calculate the storage space required for:

(i) said col-data;

(ii) a fixed point encoding of said col-data; and (iii) a fixed point encoding of said first datum and said difference-data;

(h) if the storage space calculated in (g)(ii) is less than that calculated in (g)(i) and (g)(iii), encodes said col-data as a fixed point encoding of said col-data;

(i) if the storage space calculated in (g)(iii) is less than that calculated in (g)(i) and (g)(ii), encodes said col-data as a fixed point encoding of said first datum and said difference-data;

(j) if said col-data are 64-bit floating point values which can all be represented in 32-bits, encodes said col-data as 32-bit floating point values; or (k) leaves said col-data unchanged.

2. The method of claim 1 further characterized in that each column of the database specifies a tolerance parameter used by the compression step to decide when two data from the same column are considered to be equal, said two data from the same column being considered equal if the absolute difference between said two data from the same column is less than a linear function of the tolerance parameter specified for the column in which said two data from the same column appear.

3. The method of claim 2 further characterized in that the linear function of the tolerance parameter is one half of the tolerance parameter.

4. The method of claim 2 or 3, further characterized in that the compression of floating point col-data as an arithmetic cycle, said floating point col-data having a first element, a largest element, a smallest element, a length and a value for the difference between each successive pair of elements, is conducted by:

(a) identifying firstValue as the first element of said floating point col-data;

(b) calculating numberOfValues as the length of said floating point col-data;

(c) calculating minStep as the difference between successive pairs of elements in said floating point col-data having the smallest absolute magnitude;

(d) calculating cycleLength as the absolute difference between the largest element and the smallest element of said floating point col-data, divided by minStep, rounded to the nearest integer and then incremented by one;

(e) calculating startValue as the smallest element, if minStep is positive, or as the largest element, if minStep is negative, of said floating point col-data;

(f) calculating cycleOffset as the difference between firstValue and startValue, divided by minStep;

(g) calculating predicted values, predictedValues, corresponding to each of the elements of said floating point col-data using the equation $$\text{predictedValues}[ix] = \text{startValue} + ((ix + \text{cycleOffset}) \bmod \text{cycleLength}) * \text{minStep}$$

where ix is an index running from zero to one fewer than numberOfValues;

(h) verifying that the absolute difference between each element in said floating point col-data and the element having the same position in predictedValues does not exceed the linear function of the tolerance parameter; and (i) representing the compressed data as the numbers {numberOfValues, startValue, minStep, cycleLength, cycleOffset}.

5. The method of claim 2 or 3, further characterized in that the compression of floating point col-data as a repeated sequence, said floating point col-data having a length, is conducted by:
  (a) calculating numberOfValues as the length of said floating point col-data;
  (b) setting cycleLength to be 1;
  (c) calculating cycleSet as a set of the first cycleLength elements;
  (d) calculating fullSet as cycleSet repeated cyclically to length numberOfValues;
  (e) checking that the absolute value of the difference between each element in said floating point col-data and the element having the same position in fullSet does not exceed the linear function of the tolerance parameter;
  (f) if the check at step (e) is successful, representing the compressed data as the numbers {numberOfValues, cyclelength, cycleSet};
  (g) if the check at step (e) is unsuccessful, incrementing cycleLength by 1 to a maximum of numberOfValues and repeating steps (c) to (g).

6. The method of claim 2 or 3, further characterized in that the compression of floating point col-data as said first datum and a repeated sequence of said difference-data, is conducted by:
  (a) identifying firstValue as said first datum;
  (b) tabulating numberOfValues as the length of difference-data;
  (c) setting cycleLength to be 1;
  (d) calculating cycleSet as a set of the first cycleLength elements;
  (e) calculating fullSet as cycleSet repeated cyclically to length numberOfValues;
  (f) checking that the absolute value of the difference between each element in difference-data and the element having the same position in fullSet does not exceed the linear function of the tolerance parameter;
  (g) if the check at step (f) is successful, representing the compressed data as the numbers {firstValue, numberOfValues, cycleLength, cycleSet};
  (h) if the check at step (f) is unsuccessful, incrementing cycleLength by a to a maximum of numberOfValues and repeating steps (d) to (h).

\* \* \* \* \*

UNITED STATES PATENT AND TRADEMARK OFFICE
CERTIFICATE OF CORRECTION

| | | |
|---|---|---|
| PATENT NO. | : 8,077,059 B2 | |
| APPLICATION NO. | : 11/779791 | |
| DATED | : December 13, 2011 | |
| INVENTOR(S) | : Eric John Davies and Michael Stuart Dunham-Wilkie | |

It is certified that error appears in the above-identified patent and that said Letters Patent is hereby corrected as shown below:

Column 8, line 12: "...mutivariated at a set." should be "...mutivariate dataset."
Column 10, line 30: Subscript on "a" should be an i, not a 1.
Column 11, line 16: "element of requires," should be "element of s requires,"
Column 16, line 65: "Aversion identifying..." should be "A version identifying..."
Column 19, line 19: "cyclelength," should be "cycleLength,"
Column 20, line 20: "cycleLength by a to a maximum..." should be "cycleLength by 1 to a maximum..."

Signed and Sealed this
Twenty-seventh Day of March, 2012

David J. Kappos
*Director of the United States Patent and Trademark Office*